United States Patent [19]

Rundell

[11] 4,085,612

[45] Apr. 25, 1978

[54] HEAVY DUTY TORQUE COUPLING

[75] Inventor: Herbert A. Rundell, Houston, Tex.

[73] Assignee: Texaco Inc., New York, N.Y.

[21] Appl. No.: 724,483

[22] Filed: Sep. 20, 1976

[51] Int. Cl.² .................................................. G01L 3/10
[52] U.S. Cl. .................................................. 73/136 A
[58] Field of Search ............ 73/136 A, 136 B, 136 C, 73/136 D, 136 R, 136; 64/1 C, 15 R, 15 C

[56] References Cited

U.S. PATENT DOCUMENTS

| | | | |
|---|---|---|---|
| 2,766,617 | 10/1956 | Tyler et al. | 73/136 A |
| 3,504,538 | 4/1970 | Andrews et al. | 73/136 A |
| 3,545,265 | 12/1970 | McIlraith et al. | 73/136 A |
| 3,823,607 | 7/1974 | Rundell | 73/136 A |

Primary Examiner—Charles A. Ruehl
Attorney, Agent, or Firm—Thomas H. Whaley; Carl G. Ries; Henry C. Dearborn

[57] ABSTRACT

A heavy-duty coupling unit that incorporates a sensitive torque-measuring device. It has a compact arrangement for making a direct longitudinal torque coupling in normal use. And, in addition it provides for alternative lateral chain drive coupling. It is especially adapted for use with a rotary drilling rig.

1 Claim, 2 Drawing Figures

U.S. Patent  April 25, 1978  4,085,612
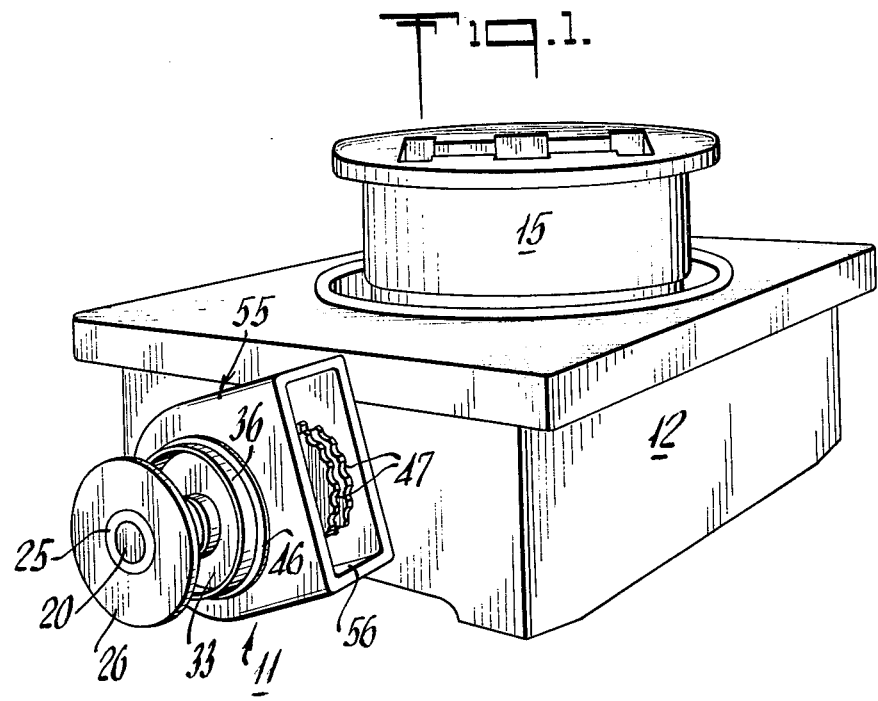
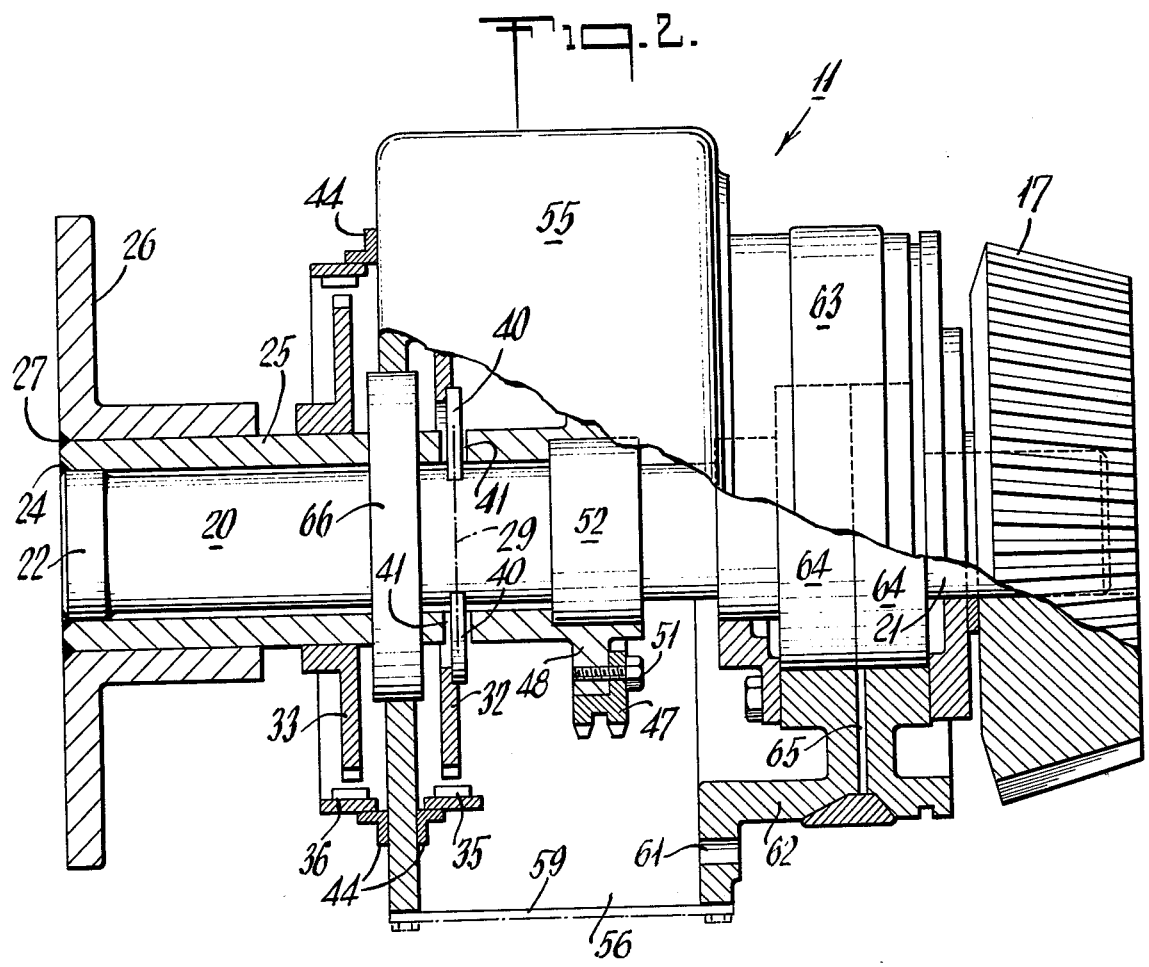

HEAVY DUTY TORQUE COUPLING

BACKGROUND OF THE INVENTION

1. Field of the Invention

This invention concerns a torque coupling unit in general. More specifically it relates to an improved heavy duty torque coupling that includes a dynamic torque measuring instrument.

2. Description of the Prior Art

Heretofore, the applicant has invented a torque meter which invention has been covered by his U.S. Pat. No. 3,295,367 issued January 3rd, 1967. Thereafter, the applicant has developed a structure for making use of the principles of a sensitive torque meter in accordance with his earlier patent, in a torque coupling structure according to his U.S. Pat. No. 3,599,482 which issued Aug. 17, 1971. Thereafter, the applicant also developed a heavy duty torque coupling which has been described and claimed in U.S. Pat. No. 3,823,607 issued July 16, 1974. The applicant's invention according to this application makes use of a torque meter structure which is in accordance with the torque meter described and claimed in the earlier indicated patents, and in addition this invention provides for an improvement that permits a direct longitudinal torque coupling that has the capability of including an alternative lateral torque coupling structure. The latter may be employed in emergency situations in order to include a torque meter coupling when a chain drive is put into use, on a rotary drilling rig.

Consequently, it is an object of this invention to provide an improved heavy-duty torque coupling, that includes the ability to make both a direct longitudinal drive coupling and an alternative lateral drive coupling.

SUMMARY OF THE INVENTION

Briefly, the invention concerns a heavy-duty dynamic high-torque-measuring coupling unit for transmitting a torque load. It comprises in combination a shaft for transmitting said torque load and having an output end and an input end. It also comprises means for making a direct longitudinal torque coupling at the input end of said shaft, and means for dynamically measuring the relative angular displacement between the input end of said shaft and a predetermined location spaced along said shaft between said input and said output ends thereof. It also comprises alternative means for making a lateral input torque coupling at said input end of said shaft.

Again briefly, the invention concerns a heavyduty dynamic high-torque-measuring coupling unit for transmitting torque load. It comprises in combination a shaft for transmitting said torque load and having an output end and an input end. It also comprises flange means integrally attached to said shaft at said input end for making a direct longitudinal torque coupling, and means for dynamically measuring the relative angular displacement between said input end of said shaft and a predetermined location spaced along said shaft between said input and said output end thereof. The dynamic measuring means comprises a dynamic torque meter having a pair of rotors and stators, and a plurality of spokes for attaching a first of said rotors to said shaft at said predetermined location. The coupling unit also comprises alternative means for making a lateral input torque coupling at said input end of said shaft. The alternative means comprises a coaxial sleeve surrounding said shaft, and a pair of chain sprockets securely attached to said sleeve. The alternative means also comprises welding means for securely attaching said sleeve to said shaft at said input end thereof. The said dynamic measuring means also comprises means for attaching a second of said rotors to said sleeve on the opposite side of said first rotor from said pair of chain sprockets, and unitary means for supporting said stators adjacent to one another, as well as a corresponding plurality of slots in said sleeve for permitting said spokes to pass therethrough with freedom for maximum relative angular displacement. The coupling unit also comprises a housing for protecting said chain sprockets and includes an opening for access to said sprockets for making said lateral alternative input torque coupling.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a perspective, illustrating a torque unit according to the invention as mounted in place on the input drive of a rotary-well type of rotary unit, commonly known as a rotary table, and FIG. 2 is an enlarged side elevation, partly broken away in cross-section, illustrating the details of a coupling unit according to the invention.

DESCRIPTION OF THE PREFERRED EMBODIMENT

As indicated above, this invention is concerned with a high-torque-measuring coupling unit and such a unit is particularly applicable to use in connection with rotary drilling for oil wells or the like. Consequently, FIG. 1 illustrates a unit 11 according to the invention, mounted in driving relationship on the input of an oil-well type rotary table 12. Such a rotary table may take various forms which are supplied by various oil-well equipment manufacturers. The table 12 is mounted (when in use) at the top of a bore hole (not shown) which is being drilled in the earth, either on a land based rig or over water.

The rotary table 12 supports a so-called rotary 15 which provides for accomodating clamping structures (not shown) that support a drill string (not shown) or other elements that are employed in drilling a rotary type well. Such a rotary 15 and rotary table 12 are part of a well known type of equipment that is employed during the drilling of a rotary type well (usually for oil or gas).

The rotary 15 is driven in rotation by a transmission arrangement (not shown) located within the table 12. Such transmission includes a gear train (not shown) to which a bevel gear 17 (FIG. 2) is coupled. Thus, the output of the coupling unit 11 is coupled with the transmission (not shown) of the rotary table 12 for driving the rotary 15 in rotation. It may be noted that the bevel gear 17 is mounted on the output end of a shaft 20 of the unit 11.

As indicated above, the unit 11 is a dynamic high-torque-measuring coupling unit. Its function is to make a torque measurement, in a dynamic manner while transmitting a torque load from an engine (not shown) to the transmission elements (not shown) of the rotary table 12. The shaft 20 is for transmitting this torque load. It has an output end 21 to which the bevel gear 17 is attached, and an input end 22. Fixed to end 22 by welding as indicated by reference numeral 24, or other appropriate means, there is a coaxial sleeve 25 that has a flange 26 securely fastened to it. Flange 26 is also welded as indicated by reference numeral 27, or otherwise firmly attached to the outer end of the sleeve 25. It will be understood that the flange 26 may have bolt holes (not shown), or some other conventional arrangement (not shown) for coupling the rotational driving force, i.e. input of torque, to the shaft 20 at the input end 22 from a direct longitudinally coupled source (not shown).

In a similar manner as with my earlier dynamic torque measuring units, there is provided the means for dynamically measuring the relative angular displacements between the input end 22 of the shaft 20, and a location 29 on the shaft 20. This location 29 is spaced a predetermined distance from the input end 22 of the shaft 20.

The dynamic torque meter has been fully described in my above noted three U.S. Patents and consequently, it will be sufficient to note here the structural locations of the rotor and stator elements, which locations are part of this invention. It will be understood that the torque meter measures the amount of twist between two locations along the shaft 20 in a dynamic manner as it transmits the load. There are a pair of rotors 32 and 33 which cooperate with a corresponding pair of stators 35 and 36 respectively. The rotor 32 is mounted on the shaft 20 at the location 29 by means of a plurality of spokes 40 that are securely fastened into the surface of the shaft 20. These spokes 40 support the rotor 32 so as to maintain angular correspondence with the shaft 20 at the location 29.

However, the spokes 40 extend through the sleeve 25, and it has a corresponding plurality of slots 41 therein. It will be appreciated that these slots 41 extend circumferentially far enough to permit adequate freedom of movement for maximum torque that will be applied to the shaft 20.

The rotor 33 is integrally attached to the sleeve 25 for rotation therewith at all times. This rotor 33 is located near the other rotor 32 so that a compact arrangement is provided. The stators 35 and 36 are located adjacent to one another and are supported by a unitary double bracket arrangement 44.

Attached at the inner end of the sleeve 25, there is a pair of sprockets 47 that are fastened onto a short flange 48 at the end of the sleeve 25. Such fastening may be done in any feasible manner such as by means of bolts 51, as indicated.

There is, of course, a bearing 52 that surrounds the shaft 20 and is for supporting the sleeve 25 at the inner end thereof. This permits free, low friction rotation of the shaft 20 relative to the sleeve 25.

It will be observed that the sprockets 47 are provided in order to act as an alternative means for coupling an input torque in a lateral manner to the unit 11. Such lateral drive may be applied via a chain or chains (not shown) which would be applied around the teeth of the sprockets 47.

There is a housing 55 that is for protecting the sprockets 47. It includes an opening 56 to provide access for the chain or chains (not shown) that would be applied around the sprockets 47 whenever the alternative driving input into the unit 11 is being used. It will be appreciated that the opening 56 may have a closure plate 58 if desired. This is indicated in FIG. 2 by dashed lines. It would be applied for keeping out foreign matter when the chain drive connection is not in use.

The housing 55 may be mounted for its support in any feasible manner. For example, there is a reduced diameter end or hub 62 that is adapted for fitting into a support (not shown) extending from the side of the rotary table 12. Attachment of the housing 55 is made by bolts (not shown) which pass through bolt holes 61 located around the edge of the housing 55 outside of the hub 62.

The hub 62 holds a pair of bearings 64 that support the drive shaft 20 near its output end 21. A band 63 around the hub 62, is illustrated. It merely acts to protect a lubrication passage 65 that is associated with the bearings 64.

The other end of the housing 55 holds a bearing 66 that supports the sleeve 25 and permits low friction rotation of the sleeve therein.

OPERATION

The principles of operation of this invention encompass those which relate to my above mentioned U.S. Pat. No. 3,823,607. However, that invention did not provide for or suggest the combination that comprises a longitudinal direct drive for the torque coupling along with an alternative coupling for a lateral drive.

In operation, the input drive (longitudinal torque coupling) may be attached to the flange 26. In such case the torque load is transmitted via the input end 22 of the shaft 20 and along the shaft 20 to the output end 21 that has the bevel gear 17 attached thereto. This is usually the primary mode for transmitting the load. In this mode the dynamic torque measurement is continually determined by the relative angular displacements caused by twisting of the shaft 20, between its input end 22 and the location 29 spaced along the shaft.

The rotor 32 of the torque meter rotates with the shaft 20, at the location 29, at all times. However, the other rotor 33 of the torque meter rotates with the input end 22, since the sleeve 25 has no torque load applied to it. Consequently, the phase difference of the two AC generator signals is in accordance with the twist in the shaft 20 measured between the end 22 and the location 29.

When the alternative input drive is employed, there will be a chain (not shown) applied around the twin sprocket 47 and the torque drive will then be applied to the inner end of the sleeve 25. The drive coupling then goes from the sprocket 47 via the flange 48 and along the sleeve 25 to the input end 22 of the shaft 20. Then the driving torque is transmitted along the shaft 20 as before, to the output end 21 thereof. However, in this case, the relative angular displacement of the rotors 33 and 32 will be measuring the twist of the sleeve 25 between the location of the rotor 33 and the input end 22 of the shaft 20, in addition to the twist of the shaft 20 from input end 22 to the location 29. But, in order to avoid a substantial change in the response of the torque meter, the sleeve 25 will be constructed of a sufficiently heavy gauge material to minimize twisting action in the sleeve. Furthermore, since the deflection because of the torque applied to the sleeve 25 is proportional to a fraction of 1 divided by the diameter to the fourth power, the deflection may be made relatively small. It would be expected to be less than 10 percent additional deflection. Consequently, the difference between employing the alternative chain drive input, and the direct longitudinal drive input (via flange 26), may be made small enough so that it can be easily corrected for. Or, if desired it may be neglected.

While a particular embodiment of the invention has been described above in considerable detail, in accordance with the applicable statutes, this is not to be taken as in any way limiting the invention but merely as being descriptive thereof.

I claim:

1. Heavy-duty dynamic high-torque measuring coupling unit for transmitting a torque load in connection with rotary drilling employing a rotary table, comprising in combination a shaft for transmitting said torque load and having an output end and an input end, flange means integrally attached to said shaft at said input end for making a direct longitudinal torque coupling, gear means mounted on said output end for transmitting said torque load to said rotary table, means for dynamically measuring the relative angular displacement between said input end of said shaft and a predetermined location spaced along said shaft between said input and said output ends thereof, comprising a dynamic torque meter having a pair of rotors and stators, a plurality of spokes for attaching a first of said rotors to said shaft at said predetermined location, alternative means for making a lateral input torque coupling at said input end of shaft, comprising a coaxial sleeve surrounding said shaft, a pair of chain sprockets securely attached to said sleeve, and welding means for securely attaching said sleeve to said shaft at said input end thereof, said means for dynamically measuring also comprises means for attaching a second of said rotors to said sleeve on the opposite side of said first rotor from said pair of chain sprockets, unitary means for supporting said stators adjacent to one another, a corresponding plurality of slots in said sleeve for permitting said spokes to pass therethrough with freedom for maximum relative angular displacement, and a housing for protecting said chain sprockets and including an opening for access to said sprockets for making said lateral alternative input torque coupling.

* * * * *